Figure 1:
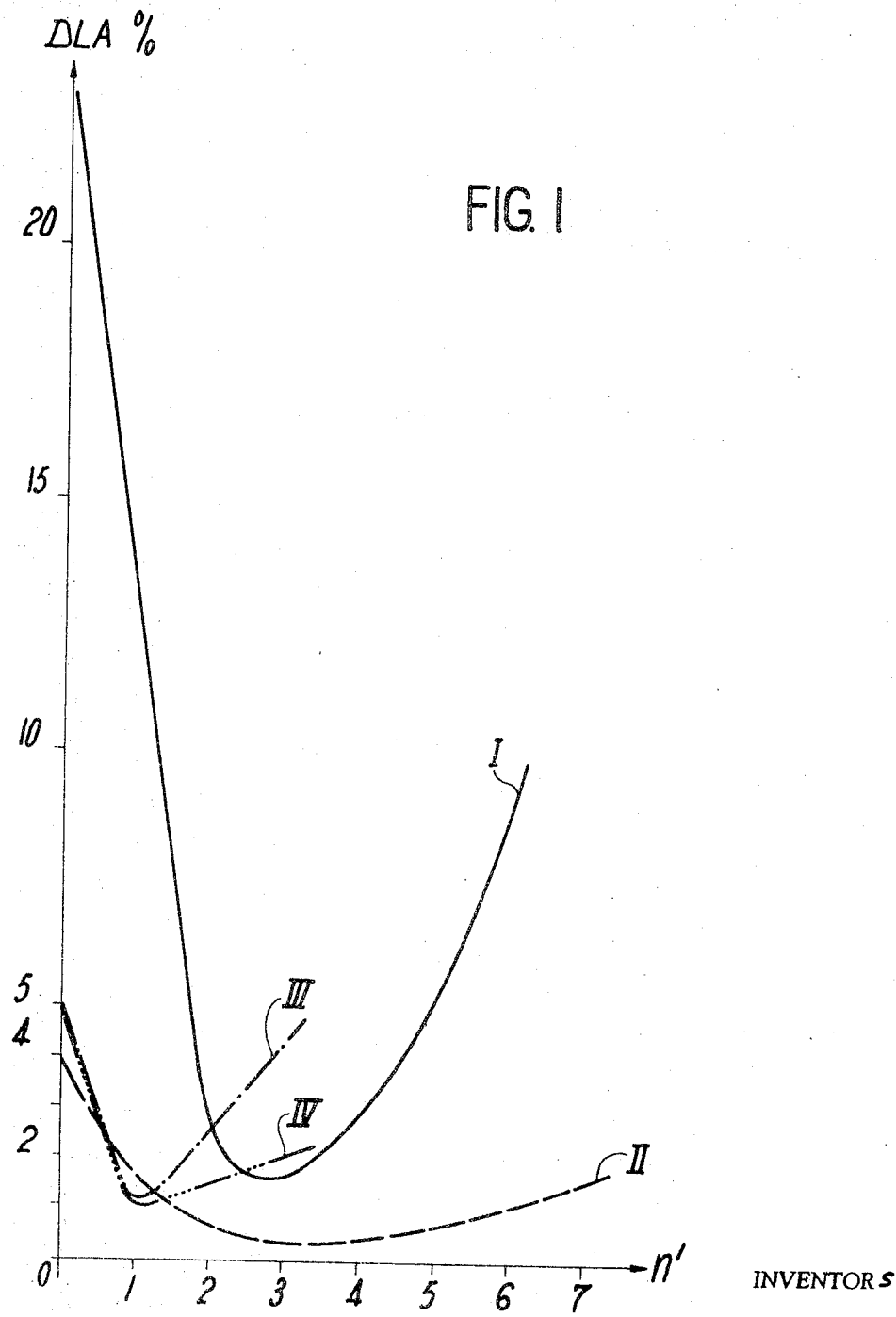

United States Patent [19]

Bathellier et al.

[11] 3,855,298

[45] Dec. 17, 1974

[54] METHOD OF PURIFICATION OF TRILAURYLAMINE

[75] Inventors: Andre Bathellier, Sceaux; Michel Germain, Boulogne, both of France

[73] Assignee: Commissariat A L'Energie Atomique, Paris, France

[22] Filed: June 3, 1968

[21] Appl. No.: 734,024

[30] Foreign Application Priority Data
June 6, 1967    France ........................... 67.109351

[52] U.S. Cl............................................ 260/583 N
[51] Int. Cl............................................ C07c 85/16
[58] Field of Search................ 260/583, 583 N, 582

[56] References Cited
UNITED STATES PATENTS

| | | | |
|---|---|---|---|
| 2,149,525 | 3/1939 | Jenkins .............................. | 260/582 |
| 3,038,904 | 6/1962 | Godfrey ..................... | 260/583 N X |

OTHER PUBLICATIONS

Kertes, Journal of Inorganic and Nuclear Chemistry, Vol. 27, pages 209 to 217, (1965).

Sidgwick, Organic Chemistry of Nitrogen, Clarendon Press, Oxford, (1966), page 102.

*Primary Examiner*—Lorraine A. Weinberger
*Assistant Examiner*—Richard L. Raymond
*Attorney, Agent, or Firm*—Craig & Antonelli

[57]    ABSTRACT

A method of purification of trilaurylamine and more especially of removal of the dilaurylamine contained in the trilaurylamine in solution in an inert organic solvent. The method essentially consists in subjecting the solvent to be purified to a basic treatment, in precipitating the dilaurylamine by addition of an acid or a salt of trilaurylamine in stoichiometric quantity so that said acid or said salt yields with the trilaurylamine a salt which is soluble in the organic phase and with the dilaurylamine a salt which is insoluble in said phase and in separating the precipitate from the solvent.

7 Claims, 5 Drawing Figures

METHOD OF PURIFICATION OF TRILAURYLAMINE

The present invention is directed to a method of purification of trilaurylamine and more especially to a method of removal of the dilaurylamine contained in trilaurylamine diluted in dodecane.

Trilaurylamine in dodecanic solution is widely employed as an industrial solvent for the purification of plutonium in nitric acid solution. However, this solvent loses a part of its chemical purity during use and consequently requires to be purified.

Dilaurylamine, one of the principal impurities contained in trilaurylamine, was removed up to the present time by passing the solvent through an alumina column. This method is costly and does not permit of rapid processing of large quantities of solvent.

Another method consists in selectively adsorbing the dilaurylamine on activated earths. This method gives good results when only small quantities of dilaurylamine are present in the solvent but can no longer be applied when the percentage of dilaurylamine contained in the solvent is of a high order. In such a case, the process calls for large quantities of activated earths and, under these conditions, the losses of trilaurylamine are considerable.

The method in accordance with the invention effectively circumvents the disadvantages referred-to in the foregoing and is applicable to the regeneration of any degraded solution of trilaurylamine, irrespective of the percentage of dilaurylamine contained in the solvent.

The method proposed consists in subjecting the solvent to be purified to a basic treatment, in precipitating the dilaurylamine in the solvent to be purified by addition of an acid or of a salt of trilaurylamine in stoichiometric quantity and in separating the precipitate from the solvent.

In the majority of cases, the solvent to be purified is present in the form of salts (salts of dilaurylamine and of trilaurylamine). It is accordingly necessary to subject the solvent to a basic treatment which transforms the salts to free amine as a result of the action of a strong base (sodium hydroxide, potassium hydroxide).

It will be understood that, if the solvent to be purified is already present in the form of free amines, preliminary treatment of the solvent with a strong base no longer serves any purpose.

If a predetermined quantity of HX acid is added to a trilaurylamine-dilaurylamine mixture, it can normally be expected that the salts of the two amines will be formed in roughly equivalent quantities, the basic character of the two amines being very closely related.

However, experience has shown that the salts of dilaurylamine are usually very sparingly soluble in trilaurylamine in dodecanic solution.

As a consequence, if we write the chemical reactions $$n (HX) + TLA \leftrightarrows TLA (HX)_n \quad (I)$$
$$n' (HX) + DLA \leftrightarrows DLA (HX)_{n'} \downarrow \quad (II)$$

equilibrium (II) will be continuously displaced towards the right, that is to say in the direction of a consumption of HX reagent, thereby causing the displacement of equilibrium (I) towards the left.

Under these conditions, if the precise quantity of acid required to form the dilaurylamine salt considered is added, reaction (II) will be quantitative and can be written:

$$n' (HX) + DLA \rightarrow DLA (HX)_{n'} \downarrow$$

In order to ensure complete precipitation of the dilaurylamine, it is necessary to ensrure that the acid is added to the solvent in stoichiometric quantity with respect to the dilaurylamine to be removed. An insufficient amount of reagent prevents complete precipitation of the dilaurylamine whilst an excess results in the formation of trilaurylamine salt and causes partial re-solution of the precipitate as a result of an increase in the dielectric constant of the solvent.

Said re-solution takes place at a rate which is correspondingly higher as the acid employed is of higher strength. In the particular case of acetic acid in which a triple salt is formed, it is necessary to add three molecules of acid per molecule of dilaurylamine in order to obtain complete precipitation.

However, the condition just mentioned is not sufficient. It is necessary to select an acid which, together with trilaurylamine, produces a salt which is soluble in dodecane. Otherwise, there is a competition between reactions (I) and (II) and precipitation of the dilaurylamine salt is no longer selective.

The added acid must form with the dilaurylamine a salt which is as sparingly soluble as possible in the organic phase. There has accordingly been found a series of acids the value of $n'$ which results in minimum solubility, wherein $n'$ designates the ratio of the number of molecules of acid to the number of molecules of dilaurylamine. The results obtained are recorded in the table given hereunder. It should be noted in connection with this table that sulfamic acid, oxalic acid and chloroacetic acid have been employed in aqueous solution and that lauric acid has been employed in dodecanic solution.

| Acids | N° | Solubility of the salts of DLA at $10^{-4}$M | Solubility of DLA in % (Mass DLA/Mass TLA × 100) |
|---|---|---|---|
| 1) Concentrated hydracids | | | |
| HF | 1 | 7 | 0.16 |
| HCl | 1 | 3.5 | <0.1 |
| 2) Concentrated oxacids | | | |
| $HNO_3$ | 1 | 9 | 0.2 |
| $H_3PO_4$ | 3 | 70 | 1.6 |
| $H_2SO_4$ | 1 | 27 | 0.6 |
| $HClO_4$ | 1 | 23 | 0.55 |
| 3) Pure organic acids | | | |
| $HSO_3NH_2$ | 1 | 3 | <0.1 |
| HCOOH | 3 | 3 | <0.1 |
| $CH_3COOH$ | 3 | 18 | 0.4 |
| COOH—COOH | 2 | 7 | 0.16 |
| Cl $CH_2COOH$ | 1 | 38 | 0.9 |
| $C_{11}H_{23}$ COOH | 1 | 65 | 1.5 |

The above results bring out the general character of the method, although the degree of contamination of the solvent with dilaurylamine varies to a large extent with the nature of the acid employed.

The curves shown in FIG. 1 and plotted experimentally show the influence of an excess or of an insufficiency of reagent with respect to the stoichiometry of the salt considered on the solubility of said salt in the solvent phase. The values of $n'$ are plotted as abscissae and the percentage of dilaurylamine dissolved in the solvent phase is plotted as ordinates. Curves I, II, III and IV relate respectively to the salts of acetic acid, formic acid, nitric acid and sulfamic acid. It is deduced from the shapes of these curves that the influence of an insufficiency of reagent is approximately the same irrespective of the salt considered whereas said influence is different in the presence of an excess of reagent.

The acids are introduced either in the form of concentrated acids or in the form of dilute acids in aqueous phase or in organic phase.

According to a particularly advantageous form of execution of the invention, the precipitation of dilaurylamine can also be obtained by adding to the trilaurylaminic to be regenerated salts of trilaurylamine in solution in dodecane. The reaction is written:

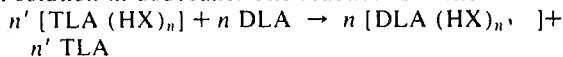

The use of trilaurylamine salts offers the advantage of carrying out the operation in homogeneous liquid phase without dilution of the solution of trilaurylamine to be purified.

Figure 2:
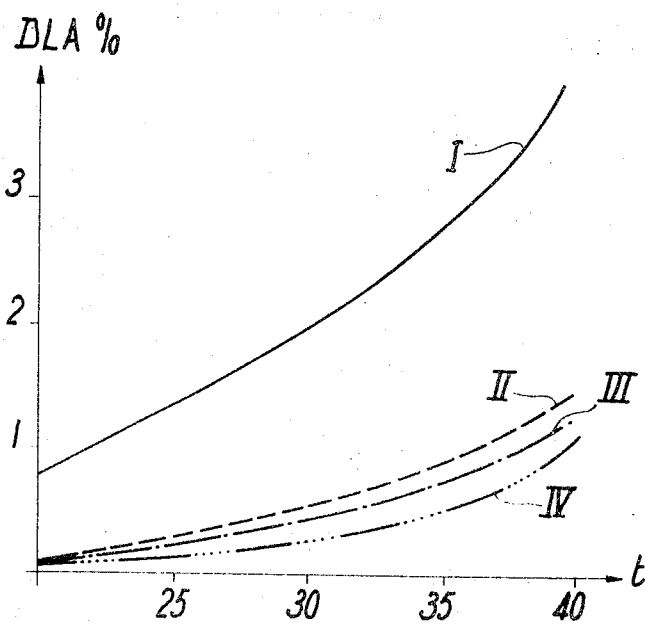

Precipitation of the dilaurylamine salt is preferably carried out at a relatively low temperature (10°–20°C) at which the solubilities of the dilaurylamine salts are at a minimum. The curves shown in FIG. 2 indicate the influence of the temperature on the solubility of the precipitates. The temperature is plotted as abscissae and the percentage of dilaurylamine dissolved in solvent phase is plotted as ordinates. Curves I, II, III and IV relate respectively to the salts of acetic acid, formic acid, nitric acid and sulfamic acid.

The salts of dilaurylamine precipitate at a fast rate. However, the kinetics of precipitation depend on the origin of the starting solution. Thus, in the case of two solutions which are degraded under different conditions, the precipitation can be either instantaneous or require several minutes.

By way of indication, a time interval of 15 minutes is required in order to precipitate with formic acid the dilaurylamine which is contained in a proportion of 5 percent in trilaurylamine in dodecanic solution and a time interval of 30 minutes is required in the case of nitric acid. If the concentration of dilaurylamine in the solution increases, the same applies to the precipitation rate. Accordingly, the dilaurylamine which is present in the solvent phase in a proportion of 5 percent is precipitated in 90 minutes by acetic acid whereas only 30 minutes are necessary to precipitate the dilaurylamine in a proportion of 23 percent in solvent phase by addition of the same acid and in order to obtain equivalent decontamination. However, it is recommended to allow the precipitate to mature prior to filtration. A maturing time of a few hours is sufficient.

The precipitates obtained are usually well crystallized and can be separated-out by filtration on fritted glass powder or sintered stainless steel powder.

Figure 3:
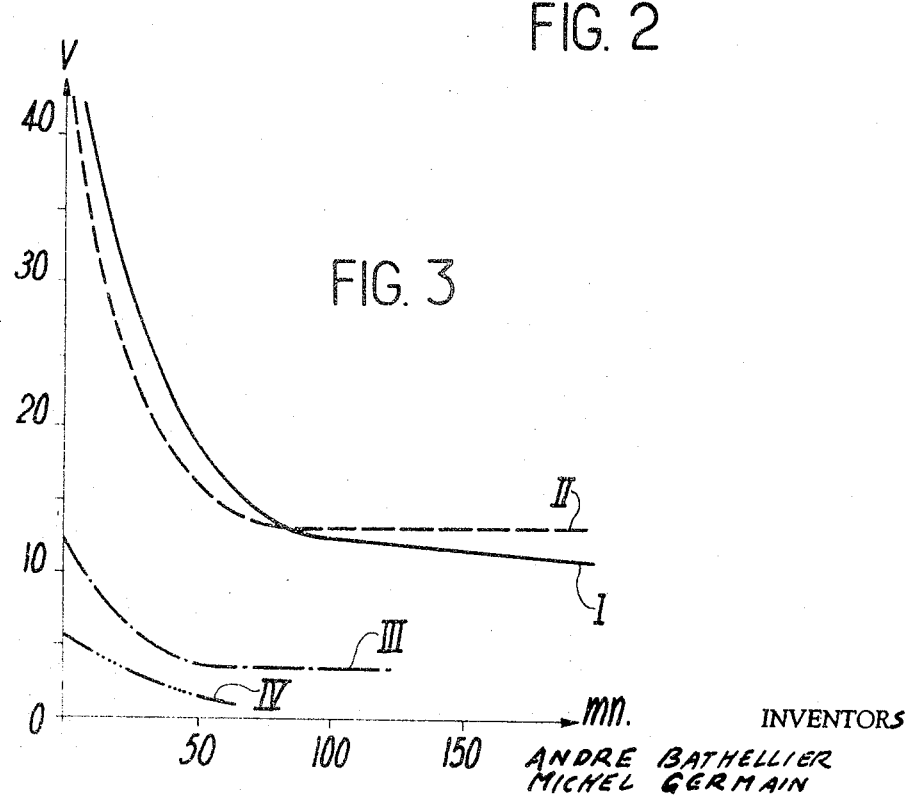
Figure 4:
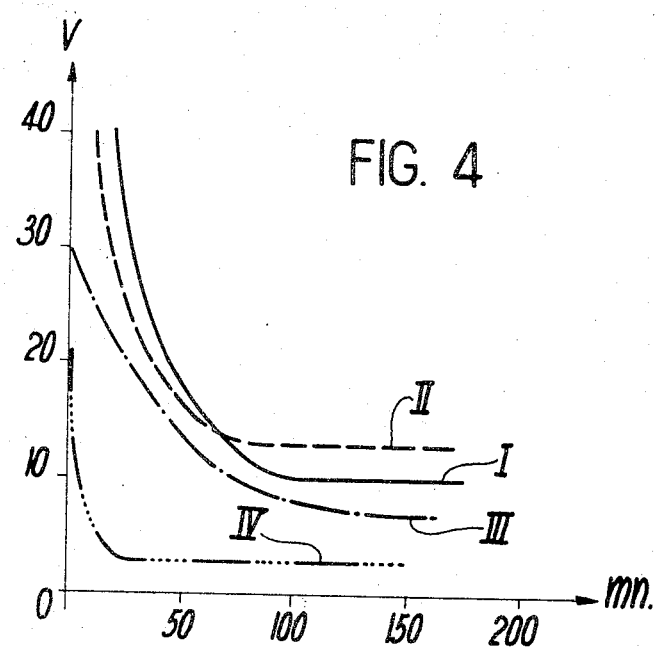
Figure 5:
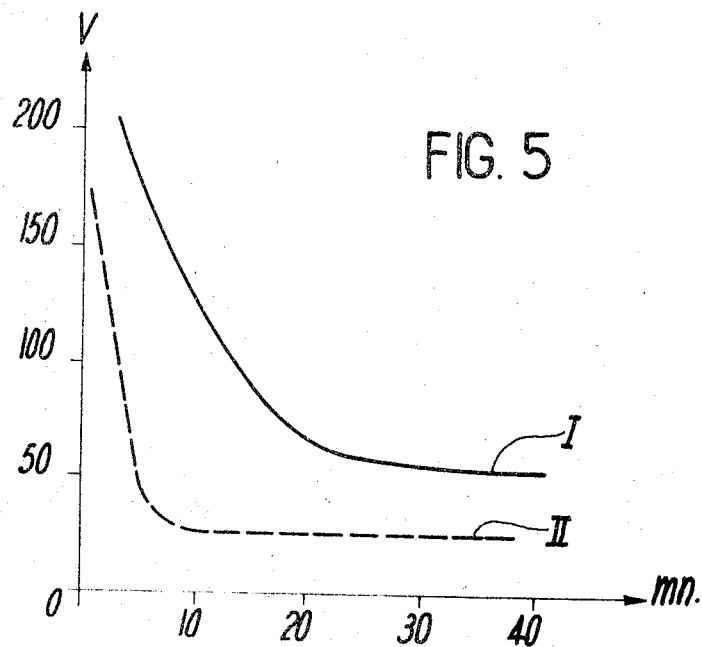

The influence of the porosity of the filter on the rates of filtration in the case of a constant partial vacuum of 700 mmHg has been studied. The curves shown in FIGS. 3, 4 and 5 show the variations in the filtration rate in the case of filters having porosities respectively of 10–20 $\mu$, 20–40 $\mu$ and 40–90 $\mu$. The time expressed in minutes is plotted as abscissae whilst the filtration rate expressed in cc/h/cm$^2$ is plotted as ordinates. Curves I, II, III, IV correspond to the same salts as those which have previously been studied.

The studies of filtration under variable vacuum show that, when the dimensions of the pores of the fritted glass or sintered metal filter are smaller than those of the grains of the precipitate, the filtration rate increases with the vacuum level but decreases in the contrary case as a result of clogging of the filter.

Other modes of operation can also be adopted. Relatively heavy precipitates such as acetate or formiate (density of the order of 0.98) can be separately by centrifugation whereas other precipitates which have a smaller particle size such as nitrate are more difficult to separate.

The method results in a relatively small loss of trilaurylamine which is dependent on the mode of separation adopted.

Thus, in the case of a manipulation in which the method of separation adopted was a filtration process, the losses of solvent retained in the precipitate were:
2.5 percent at the moment of drying of the precipitate
1.8 percent after 15 minutes of vacuum generation
1.4 percent after 1 h 45 mins of vacuum generation.

The trilaurylamine which is retained by the precipitate can in any case be partly recovered by washing said precipitate with dodecane.

The practical application of the method according to the invention is particularly simple. The continuous nature of its operation and its high flexibility make it possible to contemplate its application on an industrial scale.

A number of examples of execution of the method claimed will now be given without any limitation being implied.

EXAMPLE 1

The solvent to be purified had a concentration of dilaurylamine of 7.9 percent ($31.6 \times 10^{-3}$M).

450 cc. of said solvent which had previously been subjected to a basic treatment were treated with 1.25 cc. of nitric acid having a high concentration (11.4 N) at a temperature of 20°C. Precipitation took place at a very fast rate. The solution was allowed to mature for a period of 1 hour.

After filtration, the solvent contained 0.1 percent dilaurylamine.

EXAMPLE 2

The solvent to be purified was the same as in Example I.

One liter of said solvent which had previously been subjected to a basic treatment was treated with 3.65 cc. of formic acid having a high concentration (26 N) at a temperature of 20°C.

Precipitation was instantaneous and filtration was carried out after a maturing period of 30 minutes.

The percentage of dilaurylamine contained in the filtered solvent was lower than 0.1 percent, which is the limit of sensitivity of the method of titration.

EXAMPLE 3

The solvent to be regenerated had the following characteristics:

TLA.HNO$_3$ : 0.265 M

DLA.HNO$_3$ : 0.019 M (5 percent expressed in relation to the weight of trilaurylamine nitrate).

The solvent was first treated with one-half of its volume of 3N KOH, then washed with water under the same conditions.

Precipitation was carried out continuously by addition of trilaurylamine formate in dodecanic solution at the ordinary temperature of 21°C. The flow rate of solvent to be regenerated was 220 cc/h. The trilaurylamine salt had a concentration of trilaurylamine of 0.320 M, a total organic acid strength of 0.50 N and a flow rate of 25 cc/h.

The processing time in the mixer was approximately 1 hour.

The exit solution was collected in a beaker and allowed to mature therein for a period of 2 hours.

Filtration was carried out in a vacuum of 700 mmHg on a fritted glass disc having a porosity of 40–90 $\mu$ and an area of 35 cm². The volume to be filtered was 1 liter and the filtration process lasted 57 minutes. The average filtration rate was therefore 28 cc/h/cm².

The concentration of dilaurylamine in the filtrate was 0.2 percent.

EXAMPLE 4

The same experiment was carried out by making use of trilaurylamine acetate as precipitant.

The concentration of dilaurylamine dropped from 5 to 0.9 percent.

EXAMPLE 5

The solvent to be regenerated had the following characteristics:

TLA.HNO$_3$ : 0.294 M

DLA.HNO$_3$ : 0.013 M (3 percent expressed in relation to the weight of trilaurylamine nitrate).

The solvent was first treated with one-half of its volume 3N KOH, then washed with water under the same conditions.

Precipitation was carried out in a non-continuous manner by addition of trilaurylamine nitrate in dodecanic solution at the ordinary temperature of 21°C. The trilaurylamine salt had a concentration of trilaurylamine of 0.320 M, a total organic acid strength of 0.554 N, and precipitation was carried out in 800 cm³ of solution.

The processing time in the mixer was approximately 1 hour. The exit solution was collected in a beaker and allowed to mature for a period of 1 hour.

Filtration was carried out in a vacuum of 400 mmHg on a fritted glass disc having a porosity of 10–20 $\mu$ and an area of 60 cm². The filtration time was 25 minutes at an average rate which was therefore 34 cc/h/cm².

The concentration of dilaurylamine in the filtrate was lower than 0.1 percent.

We claim:

1. A method for the purification of a trilaurylamine-containing dodecane diluent and the removal of dilaurylamine therefrom which comprises precipitating the dilaurylamine by adding to said diluent (1) an acid selected from the group consisting of HF, HCl, HNO$_3$, H$_3$PO$_4$, H$_2$SO$_4$, HClO$_4$, HSO$_3$NH$_2$, HCOOH, CH$_3$COOH, HOOC—COOH, ClCH$_2$COOH and C$_{11}$H$_{23}$COOH or (2) an acid salt of trilaurylamine selected from the group consisting of inorganic hydracid salts, inorganic oxacid salts, sulfonic acid salts and carboxylic acid salts in a quantity which is stoichiometric with respect to the amount of dilaurylamine contained in said diluent, thereby forming a salt of the dilaurylamine which is insoluble in said diluent, and separating the resultant precipitate from the diluent.

2. A method as claimed in claim 1, wherein the dilaurylamine salt is formed at a temperature of about 10° to 20°C.

3. A method as claimed in claim 1, wherein said dodecane diluent contains salts of said trilaurylamine and dilaurylamine and, prior to the addition of the acid or said acid salt of trilaurylamine, a base is added to said diluent to convert said trilaurylamine and dilaurylamine salts to the free amine form.

4. A method for the purification of a trilaurylamine-containing dodecane diluent and the removal of dilaurylamine therefrom which comprises precipitating the dilaurylamine by adding to said dodecane diluent an acid selected from the group consisting of inorganic hydracids, inorganic oxacids, sulfonic acids, and carboxylic acids, in a quantity which is stoichiometric with respect to the amount of dilaurylamine contained in said dodecane diluent, thereby forming a salt of the dilaurylamine which is insoluble in said dodecane diluent and separating the resultant precipitate from the dodecane diluent.

5. A method for the purification of a trilaurylamine-containing dodecane diluent and the removal of dilaurylamine therefrom which comprises precipitating the dilaurylamine by adding to said dodecane diluent an an acid salt of trilaurylamine selected from the group consisting of inorganic hydracid salts, inorganic oxacid salts, sulfonic acid salts and carboxylic acid salts in a quantity which is stoichiometric with respect to the amount of dilaurylamine contained in said dodecane diluent, thereby forming a salt of the dilaurylamine which is insoluble in said dodecane diluent and separating the resulting precipitate from the dodecane diluent.

6. A method as claimed in claim 4, wherein said organic diluent contains salts of said trilaurylamine and dilaurylamine and, prior to the addition of the acid, a base is added to said diluent to convert said trilaurylamine and dilaurylamine salts to the free amine form.

7. A method as claimed in claim 5, wherein said organic diluent contains salts of said trilaurylamine and dilaurylamine and, prior to the addition of the acid salt of trilaurylamine, a base is addaed to said diluent to convert said trilaurylamine and dilaurylamine salts to the free amine form.

* * * * *